Patented Sept. 8, 1942

2,295,446

UNITED STATES PATENT OFFICE 2,295,446

MANUFACTURE OF TRIMETHYL-PARA-BENZOQUINONE

Robert Behnisch, Wuppertal-Elberfeld, Germany, assignor to Winthrop Chemical Company, Inc., New York, N. Y., a corporation of New York No Drawing. Application February 3, 1940, Serial No. 317,129. In Germany February 24, 1939

4 Claims. (Cl. 260—396)

This invention relates to improvements in the manufacture of trimethyl-para-benzoquinone.

Processes for the manufacture of trimethyl-para-benzoquinone, which is also called cumoquinone and pseudocumoquinone have already been described. It has been obtained only in an impure form by oxidation of 1-amino-2,3,4,6-tetramethylbenzene (isoduridin) which itself is only difficultly obtainable. According to another process 1-amino-2,4,5-trimethylbenzene (pseudocumidine) has first been acetylated, then nitrated in the 3- and 6-positions, then again de-acetylated, the free amino group formed removed by diazotization, the two nitro-groups reduced to amino groups and the trimethyl-1,4-phenylene-diamine finally oxidized to trimethylbenzoquinone. This process in spite of its several troublesome stages is hitherto to be considered as the best working process; for also those processes which are known for the conversion of the readily available 1-amino-2,3,5-trimethylbenzene into trimethyl-para-benzoquinone are not satisfactory. When reacting 1-amino-2,3,5-trimethylbenzene with lead dioxide in a solution of petroleum ether, first the N-(2,3,5-trimethylphenyl-1)-trimethyl-para-benzoquinone-diimide (cumyl-cumoquinone-diimide) is formed, which is split into 2,3,5-trimethylaniline and trimethyl-para-benzoquinone by the action of an acid. Apart from this the said process according to which theoretically at most 50% of the starting material can be converted into trimethyl-para-benzoquinone and in which the different reaction products are to be separated from one another works only with a bad yield. The same applies to that process in which 1-amino-2,3,5-trimethylbenzene is converted into N-dichloro-1-amino-2,3,5-trimethylbenzene by means of hypochlorite in ethereal solution at a very low temperature, the said reaction product is further transformed by the action of potassium iodide into the N-(2,3,5-trimethyl-4-chlorophenyl-1)-trimethyl-para-benzoquinone-diimide and the latter into trimethyl-para-benzoquinone and 2,3,5-trimethyl-4-chloro-aniline by treatment with an acid.

All the said known processes are scarcely suitable for the technical manufacture of trimethyl-para-benzoquinone.

The present invention provides for a new process by which the trimethyl-para-benzoquinone can be produced on a technical scale in a very convenient manner and in a practically pure form and with a good yield in only one reaction stage. In accordance with my present invention trimethyl-para-benzoquinone is produced by oxidizing 1-amino-2,3,5-trimethylbenzene with an oxidizing agent in aqueous mineral acid solution. Of course in such solution the 1-amino-2,3,5-trimethylbenzene is present in the form of its mineral acid salt. Aqueous sulfuric acid is preferred as the aqueous mineral acid, but also other mineral acids, for instance aqueous phosphoric acid may be used. Suitable oxidizing agents are, for instance, manganese dioxide, lead dioxide, chromium trioxide and the salts of chromic, dichromic and permanganic acid. The oxidation may be carried out at low temperatures, for instance at room temperature, or at increased temperatures, such as the boiling temperature of the reaction mixture. The reaction, for instance, may be carried out by performing the oxidation while stirring the mixture at room temperature and thereafter distilling off the trimethyl-para-benzoquinone formed with steam; or the oxidizing agent may be gradually added to the boiling strongly acid solution of a salt of 1-amino-2,3,5-trimethylbenzene, whereby the trimethyl-para-benzoquinone formed simultaneously is distilled off with steam. The trimethyl-para-benzoquinone obtained according to this process is at once chemically pure and is obtained in a yield of more than 60%. When reducing it in the known manner the 3-methyl-hydroquinone melting at 170° C. is obtained. Accordingly by the new process the trimethyl-para-benzoquinone which hitherto was obtainable only in an unsatisfactory manner may be produced on a technical scale in a very convenient way.

The invention is illustrated by the following examples without, however, being restricted thereto:

*Example 1*

100 grams of 1-amino-2,3,5-trimethylbenzene are introduced into a mixture of 2 liters of water and 440 ccs. of sulfuric acid while vigorously stirring; thereby the sulfate of the starting material is precipitated as a difficultly soluble precipitate. 250 grams of manganese dioxide are gradually added, whereby the temperature automatically rises to 30–35° C. and is kept on this level. After 12 hours' stirring at room temperature the trimethyl-para-benzoquinone formed is distilled off with steam. It distils as a yellow oil which solidifies to light yellow crystals. The aqueous distillate is saturated with sodium chloride, the trimethyl-para-benzoquinone is filtered with suction, washed with water and dried in the air. It melts at 32° C., the yield amounts to 68 grams (62% of the theory).

*Example 2*

50 grams of 1-amino-2,3,5-trimethylbenzene are heated to boiling in a mixture of 800 ccs. of water and 100 ccs. of sulfuric acid while passing through steam. A solution of 100 grams of sodium bichromate in 200 ccs. of water is gradually added. The bichromate solution is decolorized at once and the trimethyl-para-benzoquinone formed distils over with steam. It is separated in a similar manner as described in Example 1.

I claim:

1. The process for the preparation of trimethyl-para-benzoquinone which comprises subjecting 1-amino-2,3,5-trimethyl-benzene to oxidation in aqueous mineral acid solution by means of an oxidizing agent of the group consisting of manganese dioxide, lead dioxide, chromium trioxide and the salts of chromic, dichromic and permanganic acid.

2. The process for the preparation of trimethyl-para-benzoquinone which comprises subjecting 1-amino-2,3,5-trimethyl-benzene to oxidation in aqueous mineral acid solution by means of manganese dioxide.

3. The process for the preparation of trimethyl-para-benzoquinone which comprises subjecting 1-amino-2,3,5-trimethyl-benzene to oxidation in aqueous sulfuric acid by means of an oxidizing agent of the group consisting of manganese dioxide, lead dioxide, chromium trioxide and the salts of chromic, dichromic and permanganic acid.

4. The process for the preparation of trimethyl-para-benzoquinone which comprises subjecting 1-amino-2,3,5-trimethyl-benzene to oxidation in aqueous sulfuric acid by means of manganese dioxide.

ROBERT BEHNISCH.